(12) United States Patent
Suzuki

(10) Patent No.: US 8,804,202 B2
(45) Date of Patent: Aug. 12, 2014

(54) IMAGE PROCESSING APPARATUS, IMAGE PROCESSING METHOD, AND RECORDING MEDIUM

(75) Inventor: Takeshi Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 38 days.

(21) Appl. No.: 13/611,685

(22) Filed: Sep. 12, 2012

(65) Prior Publication Data

US 2013/0070304 A1    Mar. 21, 2013

(30) Foreign Application Priority Data

Sep. 16, 2011  (JP) ................................. 2011-203295
Aug. 15, 2012  (JP) ................................. 2012-180254

(51) Int. Cl.
  *G06T 5/00*       (2006.01)
  *H04N 1/407*     (2006.01)
  *H04N 1/409*     (2006.01)

(52) U.S. Cl.
  USPC ........................................................ 358/3.27

(58) Field of Classification Search
  None
  See application file for complete search history.

(56) References Cited

U.S. PATENT DOCUMENTS

| 8,189,246 B2* | 5/2012 | Washino ........................ 358/540 |
| 2007/0171444 A1 | 7/2007 | Washino |
| 2010/0231603 A1* | 9/2010 | Kang ............................ 345/591 |
| 2012/0206490 A1 | 8/2012 | Hikida |

FOREIGN PATENT DOCUMENTS

| JP | 2007-199291 | 8/2007 |
| JP | 4081365 | 4/2008 |

OTHER PUBLICATIONS

U.S. Appl. No. 13/416,259, filed Mar. 9, 2012, Suzuki.

* cited by examiner

*Primary Examiner* — Mark Zimmerman
*Assistant Examiner* — Michael Burleson
(74) *Attorney, Agent, or Firm* — Harness, Dickey & Pierce, P.L.C.

(57) ABSTRACT

An image processing apparatus for generating a pattern of a recording material to be overlapped on an original image for forming an image of a target region extracted from the original image, includes an arithmetic unit calculating a feature amount of an image data included in a boundary region of the target region; a determination unit determining a degree of change of color in the boundary region based on the feature amount; and a pattern generation unit determining a gradation of the pattern of the recording material for the boundary region in accordance with the degree of change of color in the boundary region.

11 Claims, 16 Drawing Sheets

CLEAR TONER PATTERN

ORIGINAL IMAGE

ORIGINAL IMAGE

CLEAR TONER PATTERN

FIG.15

|  | 0<=grad<25 | 25<=grad<50 | 50<=grad<75 | 75<=grad |
|---|---|---|---|---|
| 0<=I<50 | 10 | 5 | 0 | 0 |
| 50<=I<100 | 15 | 10 | 5 | 0 |
| 100<=I<200 | 15 | 10 | 5 | 0 |
| 200<=I<256 | 20 | 15 | 10 | 5 |

I: LUMINANCE    grad: LUMINANCE GRADIENT

PATTERN A | PATTERN B | PATTERN C | PATTERN D

|  | 0<=grad<25 | 25<=grad<50 | 50<=grad<75 | 75<=grad |
|---|---|---|---|---|
| 0<=I<50 | B | C | D | D |
| 50<=I<100 | A | B | C | D |
| 100<=I<200 | A | B | C | D |
| 200<=I<256 | A | A | B | C |

IMAGE PROCESSING APPARATUS, IMAGE PROCESSING METHOD, AND RECORDING MEDIUM

CROSS-REFERENCE TO RELATED APPLICATIONS

The present application claims priority under 35 U.S.C §119 to Japanese Patent Application Nos. 2011-203295 filed Sep. 16, 2011 and 2012-180254 filed Aug. 15, 2012, the entire contents of which are hereby incorporated herein by reference.

BACKGROUND OF THE INVENTION

1. Field of the Invention

The present invention generally relates to an image processing apparatus generating a pattern of recording material for forming an image, an image processing method thereof, and a recording medium.

2. Description of the Related Art

Recently, an image processing apparatus has been developed that employs an electrographic recording method, an inkjet recording method or the like and uses a recording material such as colorless toner or ink for forming an image.

For example, Japanese Patent No. 4081365 (hereinafter "Patent Document 1") proposes that clear toner amount applied to edge regions in an image is reduced so as to smooth concavity and convexity of a recording sheet.

Also, Japanese Laid-open Patent Application No. 2007-199291 (hereinafter "Patent Document 2") proposes that featured regions are extracted from an image so that clear toner is selectively applied to the extracted featured regions.

SUMMARY OF THE INVENTION

According to an aspect of the present invention, an image processing apparatus for generating a pattern of a recording material to be overlapped on an original image for forming an image of a target region extracted from the original image, includes an arithmetic unit calculating a feature amount of an image data included in a boundary region of the target region; a determination unit determining a degree of change of color in the boundary region based on the feature amount; and a pattern generation unit determining a gradation of the pattern of the recording material for the boundary region in accordance with the degree of change of color in the boundary region.

BRIEF DESCRIPTION OF THE DRAWINGS

Other objects, features, and advantages of the present invention will become more apparent from the following description when read in conjunction with the accompanying drawings, in which:

FIG. 15 is a example look-up table;

DETAILED DESCRIPTION OF THE PREFERRED EMBODIMENTS

Figure 1:
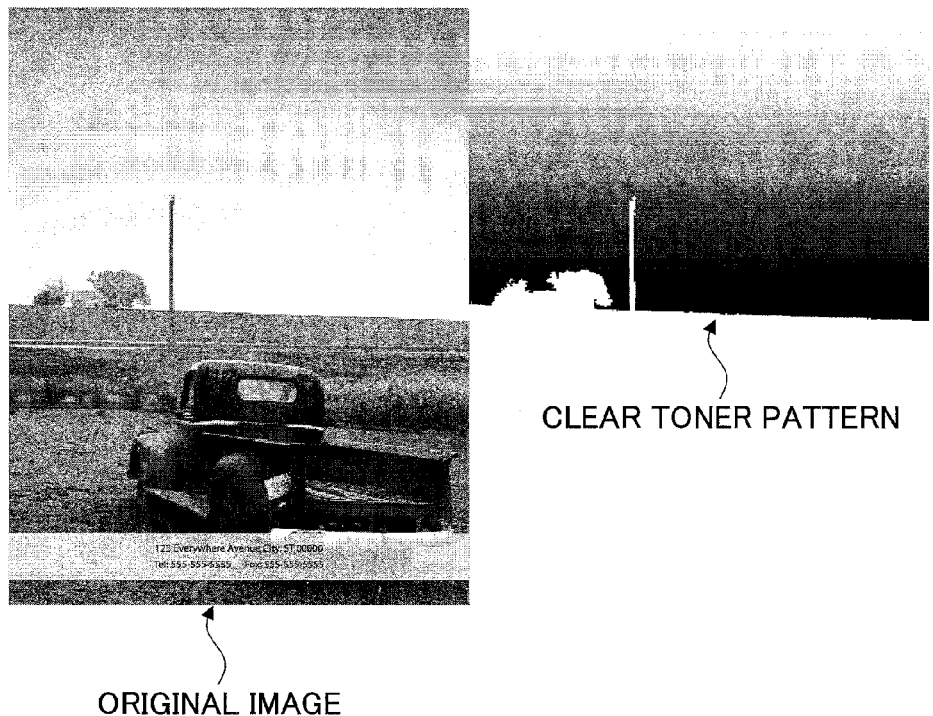
FIG. 1 is a drawing schematically illustrating a toner pattern with respect to an original image.

In the following, preferred embodiments of the present invention are described with reference to the accompanying drawings. Throughout the description and the figures, the same reference numerals may be used to describe the same or substantially the same elements, and the repeated descriptions thereof may be omitted.

INTRODUCTION

As described above, recently, an image processing apparatus has been developed that employs an electrographic recording method or an inkjet recording method and uses transparent toner or ink for forming an image. In the image processing apparatus, a transparent toner (hereinafter may be referred to as a "clear toner") is (partially) overlapped (applied) on an original image. This may be called "spot clear". By forming an image in this way, it becomes possible to emphasize the part of the original image due to difference in gloss.

There have been techniques as disclosed in Patent Documents 1 and 2. However, in those techniques, it may be difficult to perform finishing process so as to form an output printing that is similar to a target (original) image if there is a blurring at a target object in the picture so that the boundary of the target object is blurred (unclear). More specifically, in the method described in Patent Document 1, it may be possible to change a predetermined amount of clear toner in accordance with, for example, a feature of an edge of an image.

However, it may be difficult to appropriately adjust and change the amount of toner in response to the degree of unclearness of the boundary part. Further, in the method described in Patent Document 2, it may be possible to appropriately adjust the amount of clear toner with respect to a featured region extracted from an original image. However, it may be difficult to generate, for example, a gradation pattern with respect to the featured region.

The present invention is made in light of the above problems, and may become possible to generate an appropriate pattern of a boundary region of a target object in an image so as to form a natural image (i.e., image similar to the target object) when a pattern of a recording material for forming an image is generated.

According to an embodiment of the present invention, it may become possible to generate an appropriate pattern of a boundary region of a target object in an image so as to form a natural image (i.e., image similar to the target object) when a pattern of a recording material for forming an image is generated.

Clear Toner Pattern

FIG. 1 schematically illustrates a clear toner pattern to be overlapped with (applied on) an original image. For example, in order to emphasize (highlight) an area of the sky in the picture of the original image shown on the left-hand side of FIG. 1, the clear toner pattern on the right-hand size of FIG. 1 is overlapped on the area of the sky. By doing this, it becomes possible to emphasize the area of the sky of the image to which the clear toner pattern is overlapped.

When the area of the sky extracted from the original image is clear, a region dividing process described below can be performed well. Therefore, a region where the clear toner is to be overlapped on may be extracted. However, when there is a blur in the object to be imaged and the boundary of the object is accordingly blurred, it may become difficult to clearly extract an area where clear toner is to be overlapped (applied).

In this case, an amount of clear toner is adjusted in the boundary region of the object in a manner that a pattern of the boundary region of the object is changed smoothly in accordance with the vagueness of the image. By smoothing the transition (change) of the toner pattern in the boundary region in this way, the printing finally formed may be naturally finished.

Figure 2:
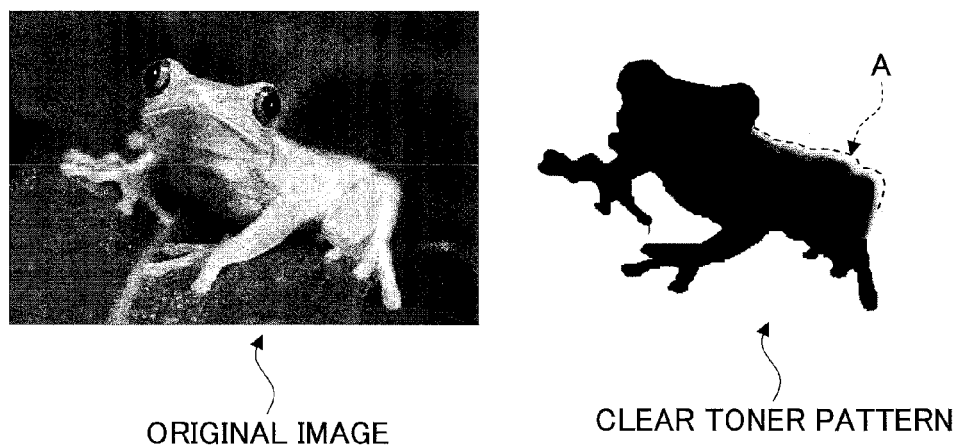
FIG. 2 is a drawing schematically illustrating a gradation process of a toner pattern with respect to an original image.

Similar to FIG. 1 where the clear toner pattern is overlapped on the region of the sky of the original image, in FIG. 2, a clear toner pattern is overlapped on the area of the frog in the original image. In this case, however, a boundary part of the frog is blurred because the object is blurred. To compensate the blurred part, a gradation process is performed on a corresponding part of the clear toner pattern (i.e., an area of the dotted part of the boundary part "A"). In those clear toner patterns, the maximum amount of toner is applied to the black parts and the minimum amount of toner is applied to the while parts.

Target Region of Image Processing

In embodiments below, a gradation process of the clear toner pattern may be mainly described. To that end, first, a target region of the imaging process is briefly described.

In order to analyze an input image and generate an appropriate clear toner pattern, the following steps may become necessary.

Step (1): Extracting a (target) region on which the clear toner pattern is to be overlapped; and Step (2): Determining a spatial pattern of the clear toner ("clear toner pattern") to be applied to the extracted region extracted in step (1).

As a method of step (1), for example, the target region may be extracted from the original image by using a general objection extraction method such as a known face region extraction method. Otherwise, the region may be designated manually by a user so that the designated region is extracted as the target region.

As a method of step (2), for example, based on a feature amount extracted in the target region extracted in step (1) or another image region, an arbitrary space pattern may be selected from among predetermined patterns. Otherwise, the target region may be uniformly overlapped (painted).

Figure 3:
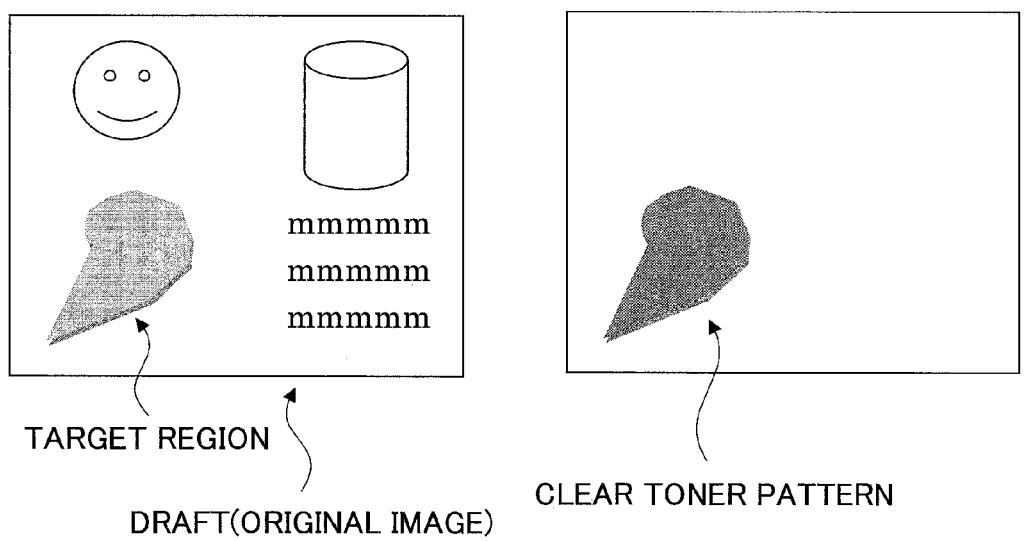
FIG. 3 is a drawing schematically illustrating a target region to be image-processed by an image processing apparatus according to an embodiment.

In embodiments described below, as schematically illustrated on the left-hand side of FIG. 3, it is assumed that the target region where the clear toner patter is to be applied (overlapped) in a draft (original image) is already determined. Therefore, a process (method) of determining the spatial pattern of the clear toner (a texture in the region on the right-hand side of FIG. 3) to be applied to the target region is mainly described. The spatial pattern includes at least a gradation of the boundary region.

Figure 4:
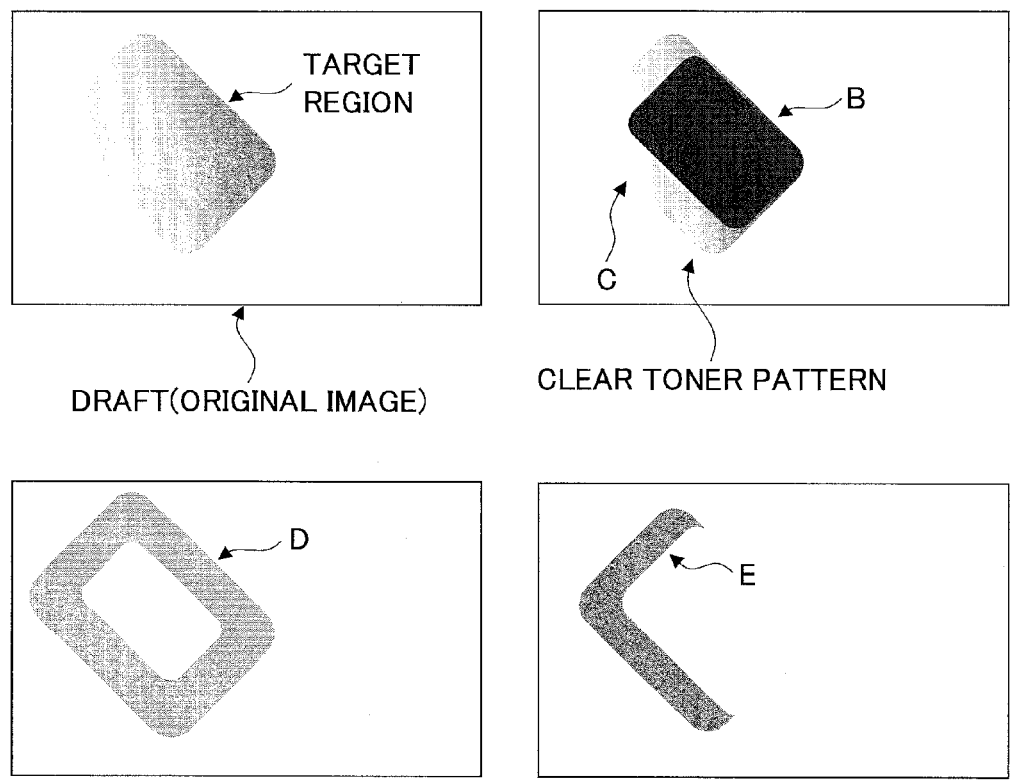
FIG. 4 is another drawing schematically illustrating a target region to be image-processed by an image processing apparatus according to an embodiment.

Further, in embodiments described below, for example, it is assumed that, from among spatial patterns on the upper right side of FIG. 4, the spatial pattern B is already painted corresponding to an object part where the target object in the target region of upper left side of FIG. 4 is clear.

Therefore, a process (method) of generating the clear toner pattern (spatial pattern) in the boundary part C of the target region where the target object is blurred is mainly described. Namely, cases will be described by assuming that the clear toner pattern has a contact value except for the boundary region. However, it should be noted that the present invention is not limited to such cases.

The boundary region may be determined as described below. For example, as illustrated on the lower left side of FIG. 4, a region D determined after the region dividing process is performed on the (original) image is analyzed to calculate gradient.

Then, a comparison process is made between the absolute value of the calculated gradient and a predetermined threshold value to determine a boundary region E (illustrated in lower right side of FIG. 4) where the clear toner is to be actually applied. Then, a gradation is applied to (performed on) the clear toner pattern in the boundary region E so as not to provide a feeling of strangeness. In the following embodiments, the gradation process of the clear toner pattern in the boundary region is mainly described.

First Embodiment

Configuration of Image Forming System (Hardware Configuration of Image Processing Apparatus)

Figure 5:
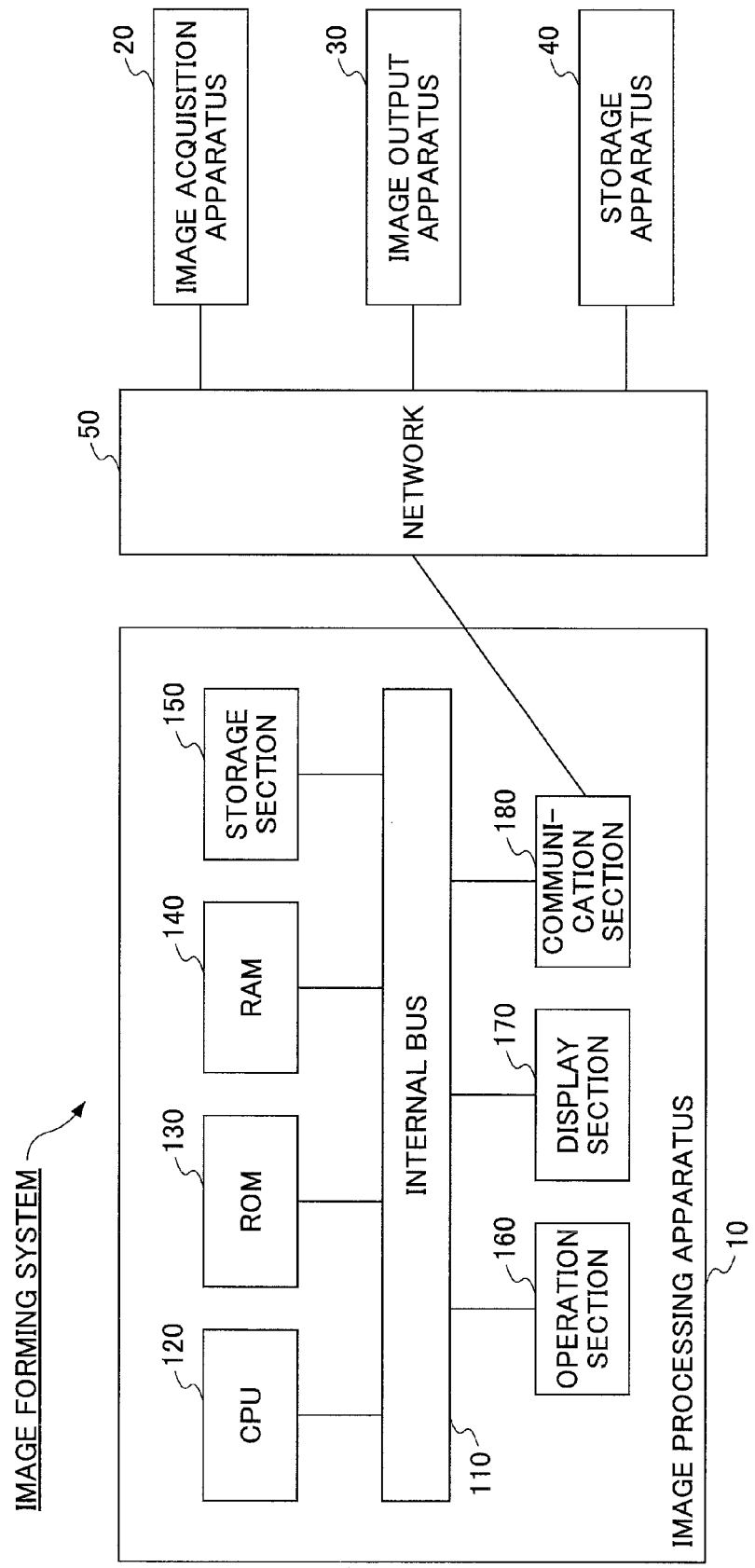
FIG. 5 is a drawing illustrating an example configuration of an image forming system according to an embodiment.

First, a configuration of an image forming system according to a first embodiment is described with reference to FIG. 5. FIG. 5 illustrates an example configuration of an image forming system according to the first embodiment, the configuration including a hardware configuration of an image processing apparatus.

As illustrated in FIG. 5, an image forming system 1 includes an image processing apparatus 10, an image acquisition apparatus 20, an image output apparatus 30, and a storage apparatus 40. The image processing apparatus 10, the image acquisition apparatus 20, the image output apparatus 30, and the storage apparatus 40 are connected to each other via a network 50. The network 50 may be a wired or wireless network.

The image processing apparatus 10 generates a pattern of a recording material such as colorless toner or ink, and performs an image forming process based on the electrographic recording method, the inkjet recording method or the like. The image processing apparatus 10 may be embedded in, for example, a printer, a copier, a printing machine and the like to be integrated into a main body of the printer or the like, or may be separately provided from the main body of the printer or the like.

The image processing apparatus 10 may be provided as a general Personal Computer (PC). The image processing apparatus 10 is connected to the image acquisition apparatus 20 such as a scanner, the image output apparatus 30 such as a printer and the storage apparatus 40 such as a Hard Disk Drive (HDD) via the network 50.

The image processing apparatus 10 includes a Central Processing Unit (CPU) 120, a Read-Only Memory (ROM) 130, a Random Access Memory (RAM) 140, a storage section 150, an operation section 160, a display section 170, and a communication section 180, which are connected to each other via an internal bus 110.

The ROM 130 is a memory storing a program and data. The RAM 140 is a memory temporarily storing a program and data necessary for the CPU 120 to execute various operations. The CPU 120 is a processor controlling the entire image processing apparatus 10 by loading the program and the data from the ROM 130 and the storage section 150 to the RAM 140 and executing the program.

The storage section 150 may be, for example, a hard disk drive serving as a large-capacity internal storage device storing programs and data to be used when the CPU 120 execute the various operations. The operation section 160 is a user interface so that a user may operate the image processing apparatus 10, and includes a keyboard and a mouse.

The display section 170 may be a Liquid Crystal Display (LCD), a Cathode Ray Tube (CRT) or the like, and is a user interface displaying information input through the operation section 160, an operation status of the image processing apparatus 10 and the like. The communication section 180 is a device to perform data communications with the image acquisition apparatus 20, the image output apparatus 30, and the storage apparatus 40 via the network 50.

The image acquisition apparatus 20 is an apparatus to acquire image information of an image such as a picture, a draft, and scenery the like. The image acquisition apparatus 20 may include, but not limited to, an image scanner and a digital camera.

The image output apparatus 30 is provided for forming an image. The image output apparatus 30 includes, but is not limited to, a printer and a plotter employing the electrographic recording method or the inkjet recording method. The storage apparatus 40 is an external storage apparatus having a large capacity such as a Hard Disk Drive (HDD).

By having the configuration described above, the image processing apparatus 10 may acquire any of an input image stored in the storage section 150 or the external storage apparatus 40 and an input image acquired by the image acquisition apparatus 20. The acquired input image is temporarily stored in the RAM 140 having a working area. An image processing performed on the input image based on a predetermined processing method.

A result of the image processing may be stored in the RAM 140 or the storage section 150, or may be stored in the storage apparatus 40 via the network 50. In the image forming system 1, according to an instruction from a user, the image processing apparatus 10 transmits the image information having been image-formed and stored in the RAM 140 to the image output apparatus 30 via the network 50. Then, the image output apparatus 30 prints and outputs the image-processed image.

As described above, the image processing apparatus 10 performs a process on the input image based on the predetermined processing method. The process is realized by executing the program loaded from the ROM 130, the RAM 140, the storage section 150 or the like by the CPU 120.

The program includes multiple instruction streams, and the CPU 120 sequentially executes the multiple instruction streams of the program. By the operations of the CPU 120, various functions described below may be executed in the image processing apparatus 10.

Functional Configuration of Image Processing Apparatus

Figure 6:
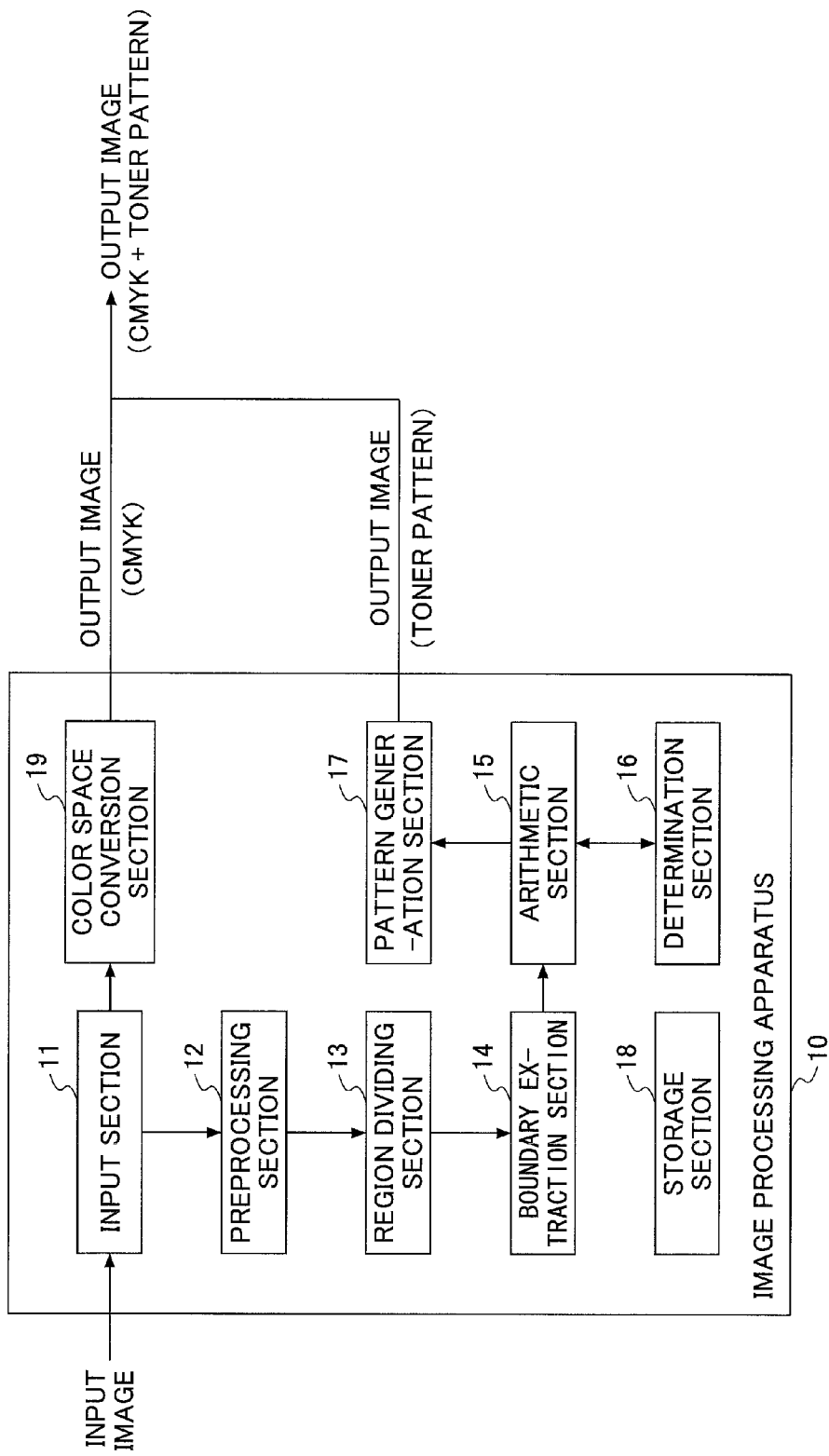
FIG. 6 is a drawing illustrating an example functional block diagram of an image processing apparatus according to first and second embodiments.

Next, a functional configuration of the image processing apparatus according to this embodiment is described with reference to FIG. 6. FIG. 6 is an functional block diagram of the image processing apparatus according to this embodiment.

As illustrated in FIG. 6, the image processing apparatus 10 in this embodiment includes an input section 11, a preprocessing section 12, a region dividing section 13, a boundary extraction section 14, an arithmetic section 15, a determination section 16, a pattern generation section 17, a storage section 18, and a color space conversion section 19.

The input section 11 acquires the input image (digital image) from the storage section 150 or the image acquisition apparatus 20. The color space conversion section 19 converts a color space in accordance with the color materials (e.g., CMYK) of the plotter when the input images is expressed in RGB color.

The image processing apparatus 10 generates not only an output image (CMYK) using the CMYK four-color toners based on the output from the color space conversion section 19 but also a pattern of a recording material to be used for image forming with respect to the target region extracted from the original image, and outputs as an output image (toner pattern).

In this embodiment, a transparent toner pattern (non-color pattern) is generated by using a transparent toner. Further, in the following, the transparent toner pattern may be called a "clear toner pattern" or may be simplified as a "toner pattern".

In this embodiment, a case is described where the transparent toner is used. However, the present invention is not limited to this case. For example, any non-color recording material such as a transparent ink or the like may be used. Otherwise, a pattern of the recording material may also be generated (formed) by using a color toner, a color ink or the like.

Further, as a pixel value, a luminance (brightness) value is typically used when the image signal is a monochrome signal, and one or more color signals related to the luminance value or the color are used when the image signal is a color signal.

To generate the toner pattern, first, the preprocessing section 12 performs a preprocessing of an input image. The contents of the preprocessing performed by the preprocessing section 12 vary depending on the target image and system. However, in many cases, a noise reduction process, a resolution conversion process and the like are included.

In a DeskTop Publishing (DTP) process is performed, many objects are expressed as vector data. Therefore, it is not always necessary to perform the noise reduction and the resolution conversions processes on such data. However, in this embodiment, a target is a raster image object to be used in the DTP process. Therefore, it is assumed that the preprocessing section 12 performs processes including the noise reduction process, the resolution conversion process and the like.

Next, the region dividing section 13 performs the region dividing process dividing the image into a target region where the toner pattern is to be formed and another region. The region dividing section 13 may perform the region dividing process automatically or in response to user's instructions. When performing automatically, the region dividing section 13 may use a non-parametric method where the number of the regions in the image is not assumed like the average value shift method or that like.

On the other hand, when a target to be extracted is known, the region dividing section 13 may use a model such as the k-means method or the like or a parametric method where the number of regions is assumed.

The boundary extraction section 14 inputs a specific image region divided by the region dividing section 13 as the target region, and extracts the boundary part of the target region. The boundary may be defined as a curved line having no width (width=0). However, in the image forming system 1 according to this embodiment, it is important to apply gradation to the boundary part.

Figure 9:
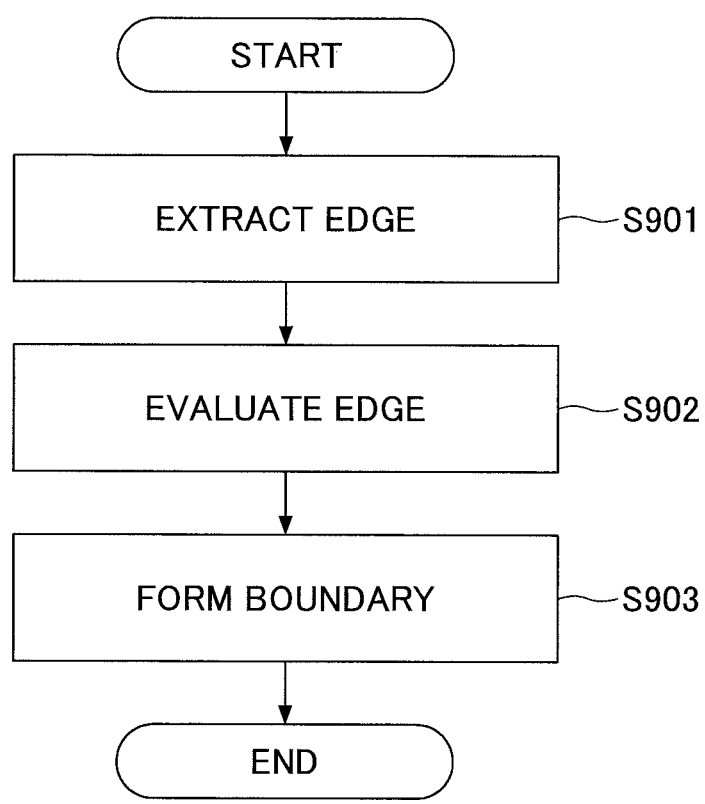
FIG. 9 is an example flowchart schematically illustrating an outline of a boundary extraction process performed by an image processing apparatus according to an embodiment.

Therefore, it becomes necessary for the boundary part of the target region to have a finite-value width. Therefore, in this embodiment, the extracted boundary region becomes a region having a certain width as the boundary region E as illustrated on the lower right side of FIG. 4. There may be various methods to extract the boundary region. However, for example, the method as illustrated in FIG. 9 may be used for the extraction. The flowchart of FIG. 9 is described below.

The arithmetic section 15 calculates a feature amount of the image data included in the boundary region of the target region. As the feature amount, the arithmetic section 15 may calculate luminance (brightness) information of the boundary region. Otherwise, the arithmetic section 15 may calculate one or more color information items of the boundary region along with the luminance information as the feature amount.

The determination section 16 determines a degree of change of color in the boundary region based on the feature amount. For example, the determination section 16 may determine the degree of change of color in the boundary region based on the luminance information. Otherwise, the determination section 16 may determine the degree of change of color in the boundary region based on the luminance information and the one or more color information items.

The pattern generation section 17 calculates and determines the gradation of the pattern of the recording material in the boundary region in accordance with the degree of change of color in the boundary region.

For example, in a case where the determination section 16 determines a luminance gradient (hereinafter may be simplified as "gradient") and the direction of the gradient of each pixel in the boundary region as the degree of change of color in the boundary region, the pattern generation section 17 may determine the gradation of the pattern of the recording material in the boundary region based on the luminance gradient determined by the determination section 16.

Further, in a case where the determination section 16 determines one or more colors, the luminance gradient, and the direction of the luminance gradient as the degree of change of color in the boundary region, the pattern generation section 17 may determine the gradation of the pattern of the recording material in the boundary region based on the change of the one or more colors, the luminance gradient, the direction of the change, and the direction of the luminance gradient in the boundary region.

The storage section 18 stores various data such as a threshold value necessary for executing the predetermined determination performed by the determination section 16.

The image data of the toner pattern generated by the pattern generation section 17 (output data: toner pattern) may be transmitted to, for example, the image output apparatus 30. In this case, in the image output apparatus 30, four patterns of images are generated using four colors (cyan, magenta, yellow, black) of toners based on CMYK output image data transmitted from the color space conversion section 19, and also the toner pattern (non-color pattern image) is formed based on the output image data of the toner pattern.

The image output apparatus 30 prints the patterns on a surface of a sheet, and outputs a print having a higher gloss by passing the sheet through a print surface processor called a glosser to apply heat and pressure. The image output apparatus 30 may terminate the image processing, and send a message of end of printing to an operator.

Analysis Principle of Boundary Region

The image processing apparatus 10 in this embodiment may use any of various methods to analyze the region generated by the region dividing process. However, in the image processing proposed in this embodiment, it is important that the gloss formed by the clear toner can be naturally reproduced without bringing a feeling of strangeness with respect to the contents of the image.

To that end, it is reasonable and preferable to analyze the contents of the image so as to determine the boundary part of the divided region. More specifically, based on the luminance gradient (gradient) of the image in the divided region, a region where the toner pattern is to be generated is determined.

When a scalar amount I given as $\psi$ (in this embodiment, luminance of image), the gradient (luminance gradient) is generally expressed as the vector field as follows:

$$\left(\frac{\partial \psi}{\partial x_1}, \frac{\partial \psi}{\partial x_2}, \ldots, \frac{\partial \psi}{\partial x_n}\right) = e_1 \frac{\partial \psi}{\partial x_1} + e_2 \frac{\partial \psi}{\partial x_2} + \ldots + e_n \frac{\partial \psi}{\partial x_n} \quad (1)$$

Where, $x_1, \ldots, x_n$ denote axes of dimensions where $\psi$ is distributed. In this case, the positions of x-axis and y-axis of the image correspond to those, and $e_1, \ldots, e_n$ denote unit vectors of those axes. Therefore, when in case is further considered, when the luminance of the image is given as I, the luminance gradient ($\nabla I$) is expressed as in the following formula (2)

$$grad \cdot I = \nabla I = \left(\frac{\partial I}{\partial x}, \frac{\partial I}{\partial y}\right) = e_x \frac{\partial I}{\partial x} + e_y \frac{\partial I}{\partial y} \quad (2)$$

For each pixel in the region D on the lower left side of FIG. 4, this gradient is calculated. Then when determining that the absolute value $|\nabla I|$ is less than or equal to a predetermined threshold value, it is determined that the pixel is in a gradation region.

$$|\nabla I| < TH \quad (3)$$

(SURF)

Other than the above, Speeded-Up Robust Features (SURF) using the multi-resolution analysis used in a second embodiment to determine the gradation region may be used. In this case, the gradient is calculated with plural resolutions.

Further, the Hessian matrix may be calculated for each resolution and the resolution where the Hessian matrix becomes maximum is selected as a main resolution, so that the gradient in the main resolution is used as the gradient of the position. the process after the gradient is determines is that same as that described above.

$$H(x, \sigma) = \begin{bmatrix} L_{xx}(x, \sigma) & L_{xy}(x, \sigma) \\ L_{xy}(x, \sigma) & L_{yy}(x, \sigma) \end{bmatrix} \quad (4)$$

In the resolution selection, the Hessian matrix (H(x,σ)) described above is used. The formula (3) is two-dimensional Hessian matrix where "x" denotes the position (x,y) and "σ" denotes the resolution. Further, "$L_{xx}$" denotes a second-order gradient indicating a second-order partial differentiation (in this case second order in X direction) in position (x,y) and resolution "σ". Similarly, "$L_{xy}$" and the like denote a partial differentiation (in the respective orders).

In this case of two dimensions, the determinant of the Hessian (H) matrix (i.e., det(H(x,σ))) is expressed as in the following formula.

$$\det(H(x, \sigma)) = L_{xx}(x, \sigma) \cdot L_{yy}(x, \sigma) - L_{xy}(x, \sigma) \cdot L_{yx}(x, \sigma) = \frac{\partial^2 I(x, \sigma)}{\partial x \partial x} \cdot \frac{\partial^2 I(x, \sigma)}{\partial y \partial y} - \frac{\partial^2 I(x, \sigma)}{\partial x \partial y} \cdot \frac{\partial^2 I(x, \sigma)}{\partial y \partial x} \quad (5)$$

Where "I(x,σ)" denotes the luminance at the position x=(x, y). The determinant indicates the convexity of the luminance change in the image region where the Hessian matrix is calculated.

The above determinant is calculated for each of the resolutions, and the resolution "σ" where the maximum determinant is calculated is determined as a main resolution, so that the gradation corresponding to the main resolution is used.

After the gradation region of the regional boundary (boundary region of the target region) is determined, the gradation in the clear toner pattern is formed. In one of the simplest method, the gradient same as the luminance gradient in the draft is used.

Namely, when "$I_{x,y}$" is given as the luminance at the position (x,y) in the draft, the value "$T_{x,y}$" of the clear toner pattern at the position (x,y) is expressed as in the following formula.

$$T_{x,y} = |\nabla I| = \sqrt{\left(\frac{\partial I}{\partial x}\right)^2 + \left(\frac{\partial I}{\partial y}\right)^2} \quad (6)$$

The gradation direction is expressed based on the gradient calculation as in the following formula $$(\cos\theta, \sin\theta) = \left(\frac{\partial I}{\partial x}, \frac{\partial I}{\partial y}\right) \quad (7)$$

Where "θ" denotes an angle between the x axis positive direction and the gradient.

The domain (definition range) and the range (range of value) depends on implementations. However, when assuming that the luminance component of the draft image data and the clear toner pattern are expressed in 8 bits, it is possible to define as in the following formula.

$$T_{x,y} = 256 \cdot H_c(u) \quad (8)$$

Figure 7:
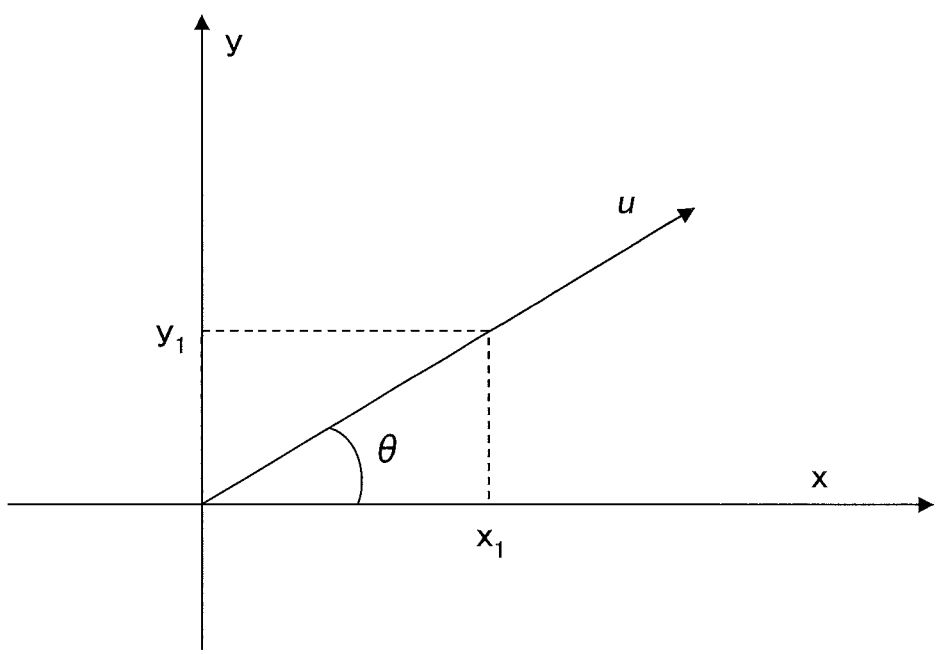
FIG. 7 is a graph illustrating an example calculating method of calculating a direction of gradation.

Where, as illustrated in FIG. 7, "u" denotes the gradation direction. Namely, it is assumed to be normalized by determining the position (x1,y1) as the origin.

When the normalization is expressed in a matrix format, the rotation matrix R(θ) at angle θ and the transfer matrix S(x1,y1) are expressed as in the following formulas.

$$R(\theta) = \begin{bmatrix} \cos\theta & -\sin\theta \\ \sin\theta & \cos\theta \end{bmatrix} \quad (9)$$

$$S(x_1, y_1) = \begin{bmatrix} -x_1 \\ -y_1 \end{bmatrix} \quad (10)$$

By combining those, the normalized output (x',y') is expressed using the input (x,y) as in the following formula.

$$\begin{bmatrix} x' \\ y' \end{bmatrix} = \begin{bmatrix} \cos\theta & -\sin\theta \\ \sin\theta & \cos\theta \end{bmatrix} \begin{bmatrix} x - x_1 \\ y - y_1 \end{bmatrix} \quad (11)$$

By doing this, it become possible to form the boundary region of the clear toner in a step type where the direction of the gradation is considered.

Operations of Image Processing Apparatus

Figure 8:
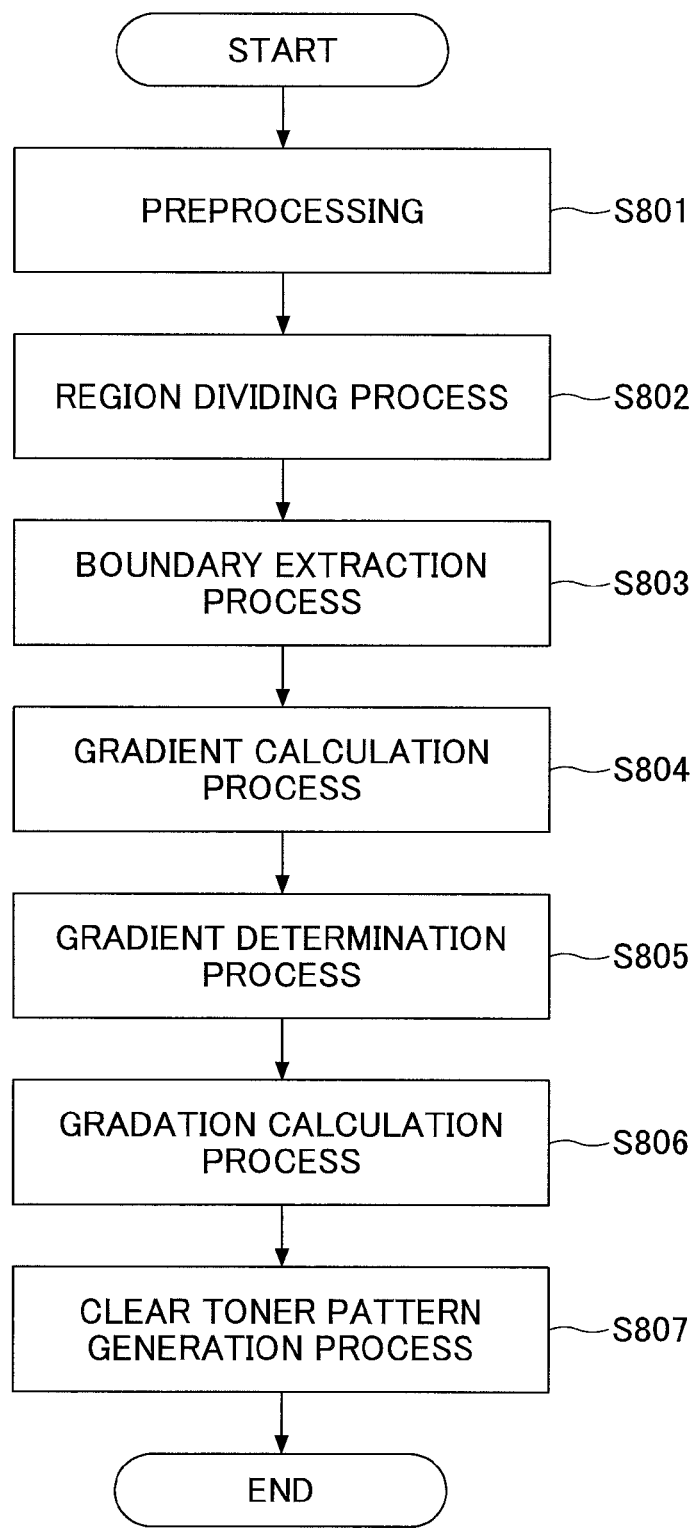
FIG. 8 is an example flowchart of entire operations of an image processing apparatus according to the first and second embodiments.

Next, the operations of the image processing apparatus are described with reference to a flowchart of FIG. 8. Further, details of the processes in FIG. 8 are described with reference to the flowcharts of FIGS. 9 through 12. The image processing apparatus 10 generates the clear toner pattern based on basic processes of FIG. 8.

Preprocessing

First, in step S801, the preprocessing section 12 performs processes including the noise reduction process, the resolution conversion process and the like.

Region Dividing Process

Next, in step S802, the region dividing section 13 performs the region dividing process dividing the input image (acquired image) into a target region where the toner pattern is to be formed and another region. To that end, the region dividing section 13 may use, for example, the split-and-merge algorithm to divide the image into regions. However, the region dividing process method is not limited to the algorithm.

In the split-and-merge algorithm, the image is divided into a uniform region. To that end, first, the entire image is initially estimated as a single region and it is determined whether the region is substantially uniform. The determination is made by using a predetermined reference value.

When determining that the region is not substantially uniform, the region is evenly divided into four regions. The determination is performed in each of the divided regions. This dividing process is repeatedly performed until it is no longer necessary to divide the region.

After that, the regions adjacent and similar to each other and satisfying the reference value are combined. The combining process is repeated until it is not possible to combine any more. Then, this process ends.

Boundary Extraction Process

Next, in step S803, the boundary extraction section 14 inputs the regions divided by the region dividing section 13 as the target region, and extracts the boundary part of the target region. Details of the boundary extraction process are described below with reference to FIG. 9.

Gradient Calculation Process

Next, in step S804, the arithmetic section 15 calculates a feature amount of the image data included in the boundary region of the target region. Details of the gradient calculation process are described below with reference to FIG. 10.

Gradient Determination Process

Next, in step S805, based on the feature amount, the determination section 16 determines a change value of the gradient and the direction of the gradient as the degree of change of color in the boundary region.

In this embodiment, as the change value of the gradient, the luminance gradient of the adjacent pixels is calculated, and as the direction of the gradient, the angle of the luminance gradient is determined. Details of the gradient determination process are described below with reference to FIG. 11.

Gradation Calculation Process

Next, in step S806, the pattern generation section 17 calculates the gradation in the boundary region in accordance with the luminance gradient and the direction of the luminance gradient in the boundary region.

Clear Toner Pattern Generation Process

Next, in step S807, the pattern generation section 17 performs the gradation process on the toner pattern in the boundary region using the calculated gradation value. Details of the gradation calculation process and the clear toner pattern generation process are described below with reference to FIG. 12.

Boundary Extraction in Image Processing Apparatus

Next, details of the boundary extraction process (step S803 in FIG. 803) are described with reference to the flowchart of FIG. 9. FIG. 9 is an example flowchart of the boundary extraction process in this embodiment. The boundary extraction process is preformed by the boundary extraction section 14.

As illustrated in FIG. 9, first, in step S901, the boundary extraction section 14 extracts an edge of the divided regions. Next, in step S902, the boundary extraction section 14 evaluates the state of the extracted edge. Next, in step S903, the boundary extraction section 14 extracts the boundary region of the target region based on the evaluation of the edge.

By doing this, for example, in response to the target region D illustrated on the lower left side of FIG. 4 formed after the region dividing process, the boundary region E illustrated on the lower right side of FIG. 4 is formed. Further, the target region(s) other than the boundary region E may be uniformly patterned with an even toner amount as illustrated on the upper right side of FIG. 4. However, the present invention is not limited to this, and, for example, uneven toner amount may be used.

Gradient Calculation in Image Processing Apparatus

Next, details of the gradient calculation process (step S804 in FIG. 8) are described with reference to the flowchart of FIG. 10. The gradient calculation process is performed by the arithmetic section 15. In the following, the terms "width" and "height" refer to the width and the height of the input image, respectively.

As the feature amount of the image data, the arithmetic section 15 calculates the gradient of the boundary pixels. In this embodiment, the gradient refers to the luminance gradient. For simplification purposes, the gradient is approximated using difference from an adjacent pixel.

Figure 10:
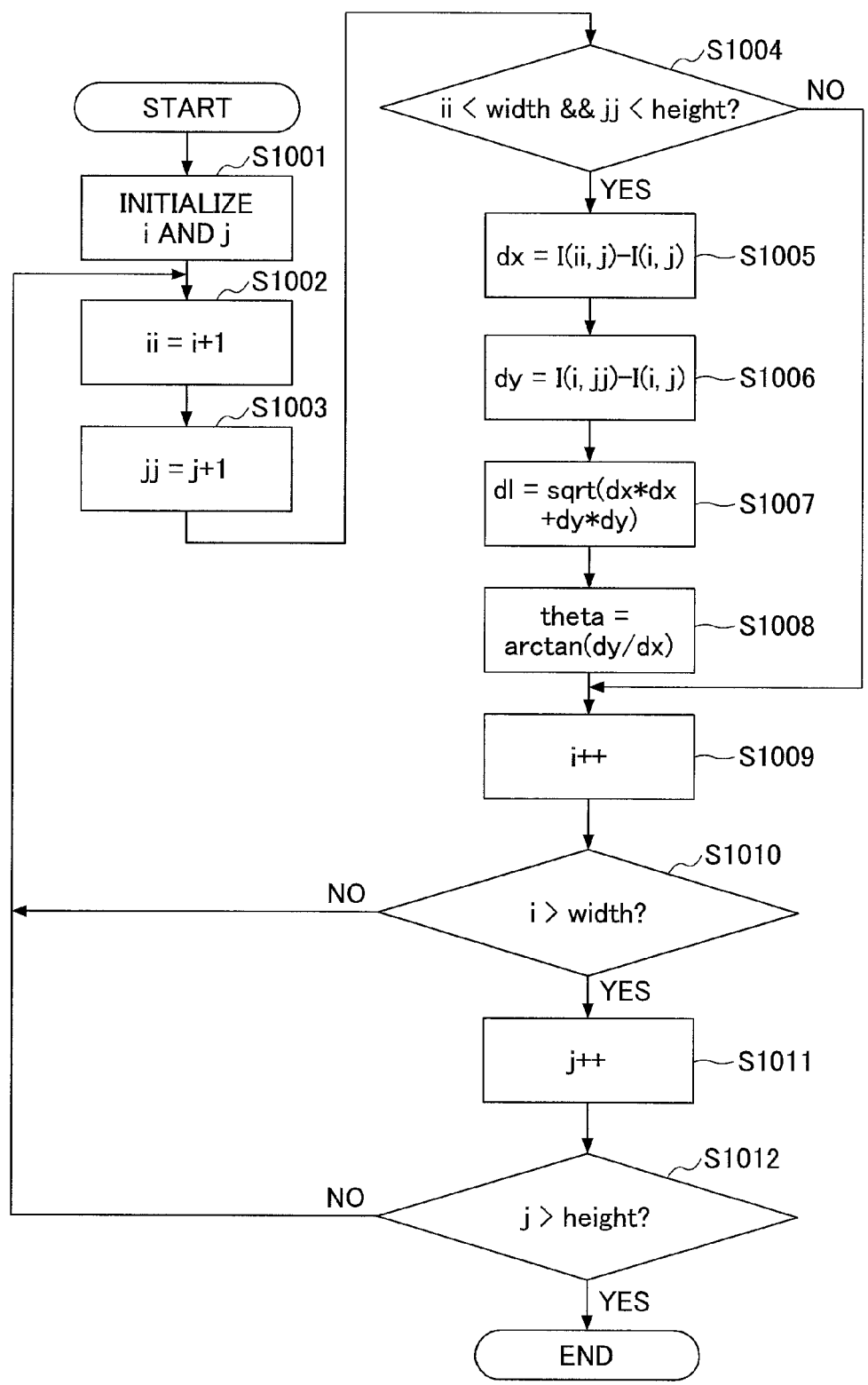
FIG. 10 is an example flowchart schematically illustrating a gradient calculation process performed by an image processing apparatus according the first embodiment.
Figure 11:
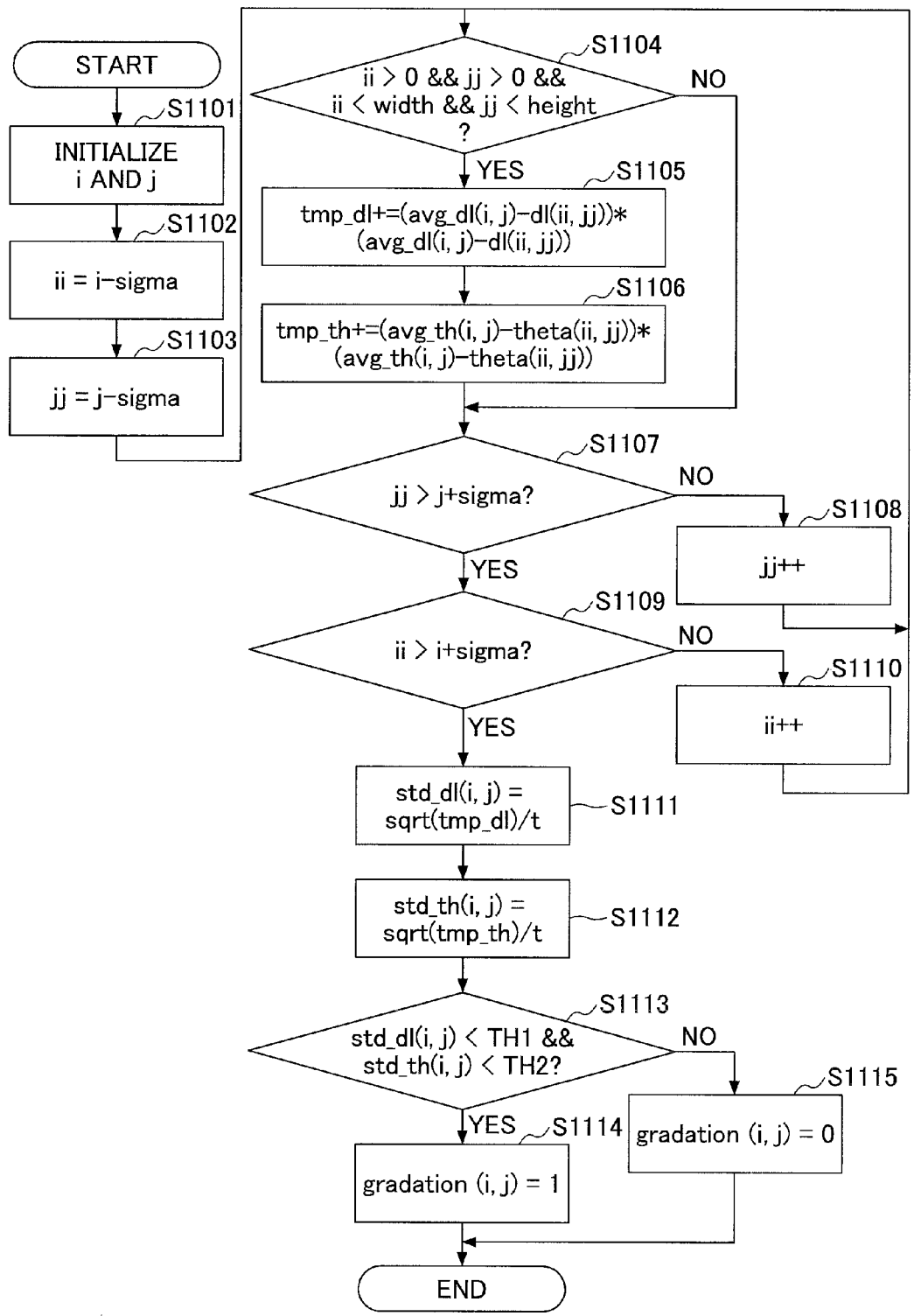
FIG. 11 is an example flowchart schematically illustrating a gradient determination process performed by an image processing apparatus according the first embodiment.

In FIG. 10, "I(x,y)" denotes the function outputting the luminance value at the position (x,y), and "dx", "dy", "dl", and "theta" denote the variation in the x direction, the variation in the y direction, the absolute value of the gradient, and the angle of the gradient, respectively.

First, in step S1001, the arithmetic section 15 initializes the variables "i" and "j". The variables "i" and "j" denote the pixel at a predetermined position in the boundary region. Next, in step S1002, the arithmetic section 15 adds "1" to the variable "i" and then substitutes the variable "i" into a variable "ii" (ii=i+1).

In step S1003, the arithmetic section 15 adds "1" to the variable "j" and then substitutes the variable "j" into a variable "jj" (jj=j+1). Next, in step S1004, the arithmetic section 15 determines whether the variable "ii" is less than the "width" of the input image and the variable "jj" is less than the "height" of the input image (ii<width and (&&) jj<height).

When determining NO in step S1004, the arithmetic section 15 skips steps S1005 through S1008 and performs the process in step S1009. When determining YES in step S1004, the arithmetic section 15 performs the processes in steps S1005 through S1008 before performing the process in step S1009.

In step S1005, the arithmetic section 15 calculates the difference in luminance value from the adjacent pixel in the x direction (the gradient in the x direction) (dx=I(ii,j)−I(i,j)). Next, the arithmetic section 15 calculates the difference in luminance value from the adjacent pixel in the y direction (the gradient in the y direction) (dy=I(i,jj)−I(i,j)).

Next, in step S1007, the arithmetic section 15 calculates the absolute value of the gradient by calculating the square root of the sum of squares of the gradient in the x direction (dx) and the gradient in the y direction (dy) (dl=sqrt($dx^2+dy^2$)).

Next, in step S1008, the arithmetic section 15 calculates the angle "theta" based on the gradients dx and dy using the arctangent function (theta=arctan(dy/dx)).

Next, in step S1009, the arithmetic section 15 adds "1" to the variable "i" ($i^{++}$). In step S1010, the arithmetic section 15 determines whether the variable "i" is greater than the "width" of the input image (i>width ?). When determining NO in step S1010, the process goes back to step S1002, and the arithmetic section 15 repeats the processes from step S1002 with respect to the next pixel.

On the other hand, when determining YES in step S1010, the process goes to step S1011, and the arithmetic section 15 adds "1" to the variable "j" (i++) In step S1012, the arithmetic section 15 determines whether the variable "j" is greater than the "height" of the input image (j>height ?). When determining NO in step S1012, the process goes back to step S1002, and the arithmetic section 15 repeats the processes from step S1002 with respect to the next pixel.

On the other hand, when determining YES in step S1012, the process ends. By the above calculations, the absolute value "dl" of the gradient and the angle "theta" of the gradient for each of the pixels in the boundary region are calculated.

Gradient Determination in Image Processing Apparatus

The absolute value "dl" of the gradient and the angle "theta" of the gradient are used to determine the gradation in the boundary part. The simplest determination may be achieved by the comparison between the absolute value "dl" of the gradient and a predetermined threshold value for each of the pixels (threshold value process)

However, to get a more accurate process, it is preferable to determine how the orientation and the direction of the gradient are distributed (gradient determination process). This gradient determination process (step S805 in FIG. 8) is described with reference to the flowchart of FIG. 11. The gradient determination process is performed by the determination section 16.

In the following example, the "ave_dl(x,y)" denotes the absolute value of the gradient in a rectangular part having the center position (x,y) of the boundary part and having a two sigma horizontal and vertical size. The "avg_th(x,y)" denotes the average value of the angle "theta" of the gradient. The "std_dl(x,y)" and the "std_th(x,y)" denote the standard deviations of the "dl" and "theta", respectively, in the rectangular part.

The "gradient (x,y)" is a determination function that outputs (becomes) a value "1" when determining that the pixel at the position (x,y) belong to a sufficiently smooth gradation region; otherwise, a value "0" is output. In this determination, a condition is satisfied when the above-described absolute value "dl" of the gradient and the angle "theta" of the gradient are less than the threshold values TH1 and TH2, respectively.

In the calculation of the "avg_th" and "avg_th", a correction process may be desired when the argument is cyclic. However, in the following example, for simplification purposes, the process is performed by assumed that the argument is a normal type.

First, in step S1101, the determination section 16 initializes the variables "i" and "j". The variables "i" and "j" denote the pixel at a predetermined position in the boundary region.

Next, in step S1102, the determination section 16 subtracts size of sigma (a value corresponding to sigma size) from the variable "i", and then substitutes the result into a variable "ii" (ii=i-sigma). In step S1103, the determination section 16 subtracts size of sigma from the variable "j", and then substitutes the result into a variable "jj" (jj=j-sigma).

Next, in step S1104, the determination section 16 determines whether the variables "ii" is greater than zero and less than the "width" of the input image and the variables "jj" is greater than zero and less than the "height" of the input image (ii>0 && jj>0 && ii<width && jj<height ?).

When determining NO in step S1104, the determination section 16 skips steps S1105 and S1106 and performs the process in step S1107. When determining YES in step S1104, the determination section 16 performs the process in steps S1105.

In step S1105, the determination section 16 calculates "tmp_dl$^+$" by calculating the square of the difference between the average value of the absolute value "dl" of the gradient "avg_dl(i,j)" and the absolute value of the gradient at the position separated from the position (i,j) by sigma "dl(ii,jj)" (i.e., tmp_dl$^+$=(avg_dl(i,j)–dl(ii,jj)*(avg_dl(i,j)–dl(ii,jj)).

Next, in step S1106, the determination section 16 calculates "tmp_th$^+$" by calculating the square of the difference between the average value of the angel "theta" of the gradient "avg_th(i,j)" and the angel of the gradient at the position separated from the position (i,j) by sigma "theta(ii,jj)" (i.e., tmp_th$^+$=(avg_th(i,j)–theta(ii,jj))*(avg_th(i,j)—theta(ii,jj)).

In step S1107, the determination section 16 determines whether the variable "jj" is greater than the sum of the variable "j" and sigma (jj≥j+sigma ?). When determining NO in step S1107, the process goes to step S1108. In step S1108, the determination section 16 adds "1" to the variable "jj", and the process goes back to step S1104, so that the processes from step S1105 are executed again. On the other hand, when determining YES in step S1107, the process goes to step S1109.

In step S1109, the determination section 16 determines whether the variable "ii" is greater than the sum of the variable "i" and sigma (ii≥i+sigma ?). When determining NO in step S1109, the process goes to step S1110. In step S1110, the determination section 16 adds "1" to the variable "ii", and the process goes back to step S1104, so that the processes from step S1105 are executed again.

On the other hand, when determining YES in step S1109, the process goes to step S1111. In step S1111, the determination section 16 calculates the standard deviation "std_dl(i,j)" of the absolute value of the gradient (i.e., std_dl(i,j)=sqrt (tmp_dl)/t). Next, in step S1112, the determination section 16 calculates the standard deviation "std_th(i,j)" of the angle theta of the gradient (i.e., std_th(i,j)=sqrt(tmp_th)/t).

Next, in step S1113, the determination section 16 determines whether the standard deviation "std_dl(i,j)" of the absolute value "dl" of the gradient is less than a predetermined threshold value TH1 and the standard deviation "std_th(i,j)" of the angle "theta" of the gradient is less than a predetermined threshold value TH2 (std_dl(i,j)<TH1 && std_th(i,j)<TH2 ?).

When determining YES in step S1113, the process goes to step S1114. In step S1114, the determination section 16 substitutes a value "1" into the determination function "gradient (i,j)", the value "1" indicating that the pixel at the position (i,j) belongs to a sufficiently smooth gradation region.

On the other hand, when determining NO in step S1113, the process goes to step S1115. In step S1115, the determination section 16 substitutes a value "0" into the determination function "gradient (i,j)", the value "0" indicating that the pixel at the position (i,j) belongs to a region other than the sufficiently smooth gradation region.

In this embodiment, a case is described where, in step S1113, when determining that the standard deviation "std_dl (i,j)" of the absolute value "dl" of the gradient is less than a predetermined threshold value TH1 and the standard deviation "std_th(i,j)" of the angle "theta" of the gradient is less than a predetermined threshold value TH2 (i.e., std_dl(i,j)<TH1 && std_th(i,j)<TH2), the determination section 16 substitutes the value "1" into the determination function "gradient (i,j)", the value "1" indicating that the pixel at the position (i,j) belongs to a sufficiently smooth gradation region.

However, alternatively, in step S1113, when determining that the standard deviation "std_dl(i,j)" of the absolute value "dl" of the gradient is less than a predetermined threshold value TH1 or the standard deviation "std_th(i,j)" of the angle "theta" of the gradient is less than a predetermined threshold value TH2 (i.e., std_dl(i,j)<TH1 OR std_th(i,j)<TH2), the determination section 16 may substitute the value "1" into the determination function "gradient (i,j)", the value "1" indicating that the pixel at the position (i,j) belongs to a sufficiently smooth gradation region.

Calculation of Gradation and Generation of Clear Toner Pattern in Image Processing Apparatus Next, with respect to the boundary pixels belonging to the sufficiently smooth gradation region, the gradation in the clear toner pattern (toner pattern) is determined by calculations. There may be several methods to calculate the gradation in the clear pattern. However, as one of the simplest methods, a method using the calculated gradient "dl" in the original image may be used.

In order to configure (generate) the clear toner pattern having the gradient similar to the luminance gradient in the boundary pixels, it may be desired to calculate gradation of the clear toner pattern in a method as described below.

Figure 12:
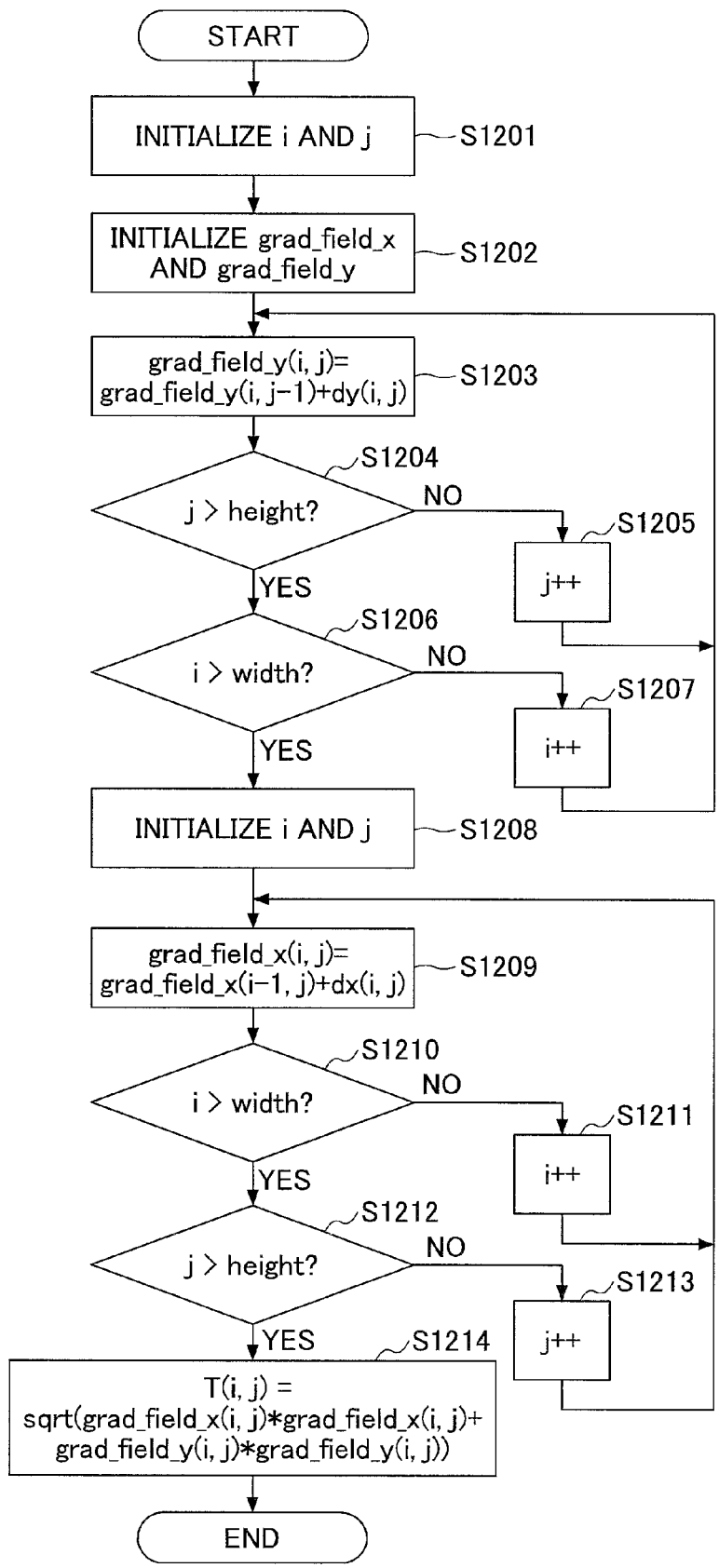
FIG. 12 is an example flowchart schematically illustrating a clear toner pattern generation process performed by an image processing apparatus according an embodiment.

In the following, details of the gradation calculation process (step S806 in FIG. 8) and the clear toner pattern generation process (step S807 in FIG. 8) are described with reference to the flowchart of FIG. 12. The gradation calculation process and the clear toner pattern generation process are performed by the pattern generation section 17.

Here, the "I(x,y)" and the "T(x,y)" denote the luminance component (gradient) and the value of the clear toner pattern, respectively, at the position (x,y) of the clear toner pattern. Further, the "grad_field_x(x,y)" and the "grad_field_y(x,y)" denote the sum of the displacement in the x direction and the sum of the displacement in the y direction, respectively, at the position (x,y).

First, in step S1201, the pattern generation section 17 initializes the variables "i" and "j". Next, in step S1202, the pattern generation section 17 initializes the sum of the displacement in the x direction at the position (x,y) "grad_field_x(x,y)" and the sum of the displacement in the y direction at the position (x,y) "grad_field_y(x,y)".

Next, in step S1203, the pattern generation section 17 adds the variation in the y direction "dy(i,j)" to the sum of the displacement in the y direction at the position (i,j−1) "grad_field_y(i,j−1)" (i.e., grad_field_y(i,j)=grad_field_y(i,j−1)+dy(i,j)).

Next, in step S1204, the pattern generation section 17 determines whether the variable "j" is greater than the "height" (j>height ?). When determining NO in step S1204, the process goes to step S1205. In step S1205, the pattern generation section 17 adds "1" to the variable "j", and the process goes back to step S1203, so that the process in step S1203 is executed again.

On the other hand, when determining YES in step S1204, the process goes to step S1206. In step S1206, the pattern generation section 17 determines whether the variable "i" is greater than the "width" (i>width ?). When determining NO in step S1206, the process goes to step S1207. In step S1207, the pattern generation section 17 adds "1" to the variable "i", and the process goes back to step S1203, so that the process of step S1203 is executed again.

When determining YES in step S1206, the process goes to step S1208. In step S1208, the pattern generation section 17 initializes the variables "i" and "j" again.

Next, in step S1209, the pattern generation section 17 adds the variation in the x direction "dx(i,j)" to the sum of the displacement in the x direction at the position (i−1,j) "grad_field_x(i−1,j)" (i.e., grad_field_x(i,j)=grad_field_x(i−1,j)+dx(i,j)).

Next, in step S1210, the pattern generation section 17 determines whether the variable "i" is greater than the "width" (i>width ?). When determining NO in step S1210, the process goes to step S1211. In step S1211, the pattern generation section 17 adds "1" to the variable "i", and the process goes back to step S1209, so that the process in step S1209 is executed again.

On the other hand, when determining YES in step S1210, the process goes to step S1212. In step S1212, the pattern generation section 17 determines whether the variable "j" is greater than the "height" (j>height ?). When determining NO in step S1212, the process goes to step S1213. In step S1213, the pattern generation section 17 adds "1" to the variable "j", and the process goes back to step S1209, so that the process of step S1209 is executed again.

When determining YES in step S1212, the process goes to step S1214. In step S1214, the pattern generation section 17 calculates the clear toner pattern at the position T(i,j) by calculating the mean square (i.e., $T(i,j)=\text{sqrt}(\text{grad\_field\_x}(i,j)^2+\text{grad\_field\_y}(i,j)^2)$).

Namely, the clear toner pattern at the position T(i,j) is calculated as the square root of the sum of the square of the sum of the displacement in the x direction at the position T(i,j) "grad_field_x(i,j)$^2$" and the square of the sum of the displacement in the y direction at the position T(i,j) "grad_field_y(i,j)$^2$". Based on the above calculations, it may become possible to determine the gradation of the clear toner pattern of the pixels in the boundary region.

Further, instead of calculating the clear toner pattern at the position T(i,j) in step S1214 based on the above calculation method, the pattern generation section 17 may use a look-up table provided in advance so as to determine the clear toner pattern by referring to the calculated absolute value of the gradient in the look-up table.

Further, instead of calculating the clear toner pattern at the position T(i,j) in step S1214 based on the above calculation method, the pattern generation section 17 may employ a method of adding the sum of the displacement in the x direction at the position T(i,j) "grad_field_x(i,j)" to the sum of the displacement in the y direction at the position T(i,j) "grad_field_y(i,j)".

The result of this calculation may also be called a "Manhattan distance". By using the Manhattan distance, it may become possible to calculate approximate value with respect to a true value of the clear toner pattern with relatively high accuracy, and reduce the workload of the above imaging process.

Effect

As described above, in the image processing apparatus 10 according to this embodiment, during the generation of the toner pattern for forming an image, an appropriate gradation process may be applied to a boundary region of a specific target object in the image with the clear toner pattern.

An exemplary effect according to this embodiment is described with reference to a case of FIG. 2 where a clear toner pattern is overlapped on a region of the frog of the input image. In this case, the frog corresponds to the specific target object, and the region of the frog corresponds to the target region on which the toner pattern is to be overlapped. In the picture of FIG. 2, the rear part of the frog of the target object is blurred.

Therefore, the gradation process is performed on the toner pattern in the boundary region A. With respect to the other object region, a pattern having an even amount of toner is overlapped. By doing this, even when a boundary part of the target object is blurred due to poor focusing or the like, it may become possible to naturally finish the printing while the part of the frog as a part of the picture is emphasized, so as to provided higher-quality printing to a user.

Second Embodiment

Next, an image processing apparatus 10 according to a second embodiment is described. The functional configuration and the hardware configuration of the image processing apparatus 10 according to the second embodiment are similar to those of the image processing apparatus 10 according to the first embodiment. Therefore, the repeated descriptions thereof may be herein omitted.

In the image processing apparatus 10 according to the second embodiment, the arithmetic section 15 selects the main resolution using the determinant of the Hessian matrix (Hessian determinant) based on plural resolutions calculated using the multi-resolution analysis, and calculates the luminance of the boundary region based on the image in the selected main resolution.

Here, the arithmetic section 15 may select the main resolution using the frequency distribution of the Hessian determinant corresponding to the plural resolutions. The arithmetic section 15 may select the main resolution using the Hessian determinant based on the plural resolutions calculated using the multi-resolution analysis, and calculate one or more colors and the luminance of the boundary region based on the image in the selected resolution.

Gradient Calculation Process in Image Processing Apparatus

In this embodiment, the SURF described above is used to extract the gradation region. The SURF calculation contains the multi-resolution analysis and the gradient calculation. Therefore, a part of the calculations described in the first embodiment may be omitted. The contents of the SURF calculation are described in the above "Analysis principle of boundary region".

By using the method of the SURF, in several predetermined resolutions, the arithmetic section 15 calculates the Hessian matrix (formula (4)) and the determinant of the Hessian matrix (formula (5)). Further, the arithmetic section 15 identifies the position and the resolution where the change amount is relatively large by performing a threshold process on the determinant. By using the characteristics (features), in the second embodiment, the arithmetic section 15 selects the resolution using the SURF for gradation calculation.

Figure 13:
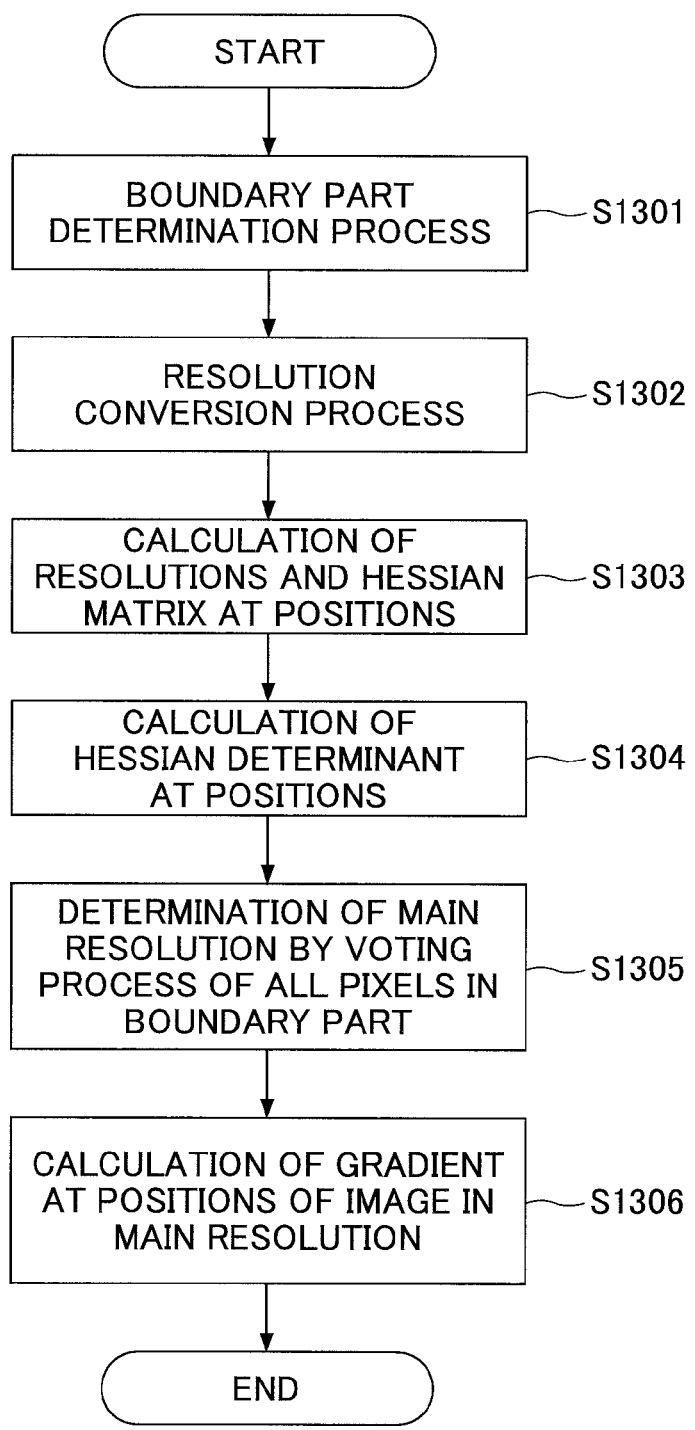
FIG. 13 is an example flowchart schematically illustrating operations (including the gradient calculation process) performed by an image processing apparatus according the second embodiment.

FIG. 13 is an example flowchart illustrating the operations of the image processing apparatus 10 in this embodiment. Here, a boundary part determination process in step S1301 of FIG. 3 is similar to the boundary extraction process in the first embodiment; therefore, the repeated description thereof may be omitted.

In step S1302, the resolution conversion process is performed. In the resolution conversion process, the arithmetic section 15 converts the resolution of the original image into plural predetermined resolutions by the resolution conversion.

After the conversion, in step S1303, the arithmetic section 15 calculates the Hessian matrixes at the positions in the boundary region with respect to the image in each of the plural resolutions based on the formula (4). Further, the arithmetic section 15 calculates the determinants of the Hessian matrixes using the formula (5).

Next, in step S1305, the arithmetic section 15 selects the resolution where the Hessian determinant is the maximum in each of the pixels determined as the boundary in the boundary part determination process.

The arithmetic section 15 performs this voting process on all the pixels in the boundary part, and determines the resolution selected in the maximum number of the pixels as the main resolution. Next, in step S1306, the arithmetic section 15 calculates the gradient of the pixels in the boundary part in the image of the main resolution. The following process in this embodiment is similar to that in the first embodiment, and repeated description thereof is herein omitted.

Effect

As described above, in the image processing apparatus according to the second embodiment, in generating the toner pattern for forming an image, the gradation process is performed on the clear toner pattern with respect to the boundary region of the target object in the image. By the gradation process applied to the boundary region, it may become possible to naturally finish the printing finally.

In addition to that, in the image processing apparatus according to the second embodiment, the multi-resolution analysis and the gradient calculation is performed using the SURF. Therefore, the above formula (5) is calculated for each of the resolutions; the resolution having the maximum number is selected as the main resolution; and then, the gradient is calculated for each of the pixels in the boundary part with respect to the image of the main resolution.

By doing this, a part of the gradient calculations described in the first embodiment may be omitted. Therefore, it may become possible to reduce the workload in the imaging process in the image processing method executed in the image processing apparatus 10 according to the second embodiment.

As described above, in the image processing method according to the first and the second embodiments, when generating the pattern of the recording material for forming an image, by performing the gradation process on the pattern in the boundary region of the target object in an image, it may become possible to provide an image processing apparatus, image processing method, a program and a recording medium capable of further naturally finishing the image.

Third Embodiment

Look-Up Table

Next, an image processing apparatus 10 according to a third embodiment of the present invention is described. The functional configuration and the hardware configuration of the image processing apparatus 10 according to the second embodiment are substantially the same as that of those in the image processing apparatus 10 according to the first and the second embodiments.

Figure 14:
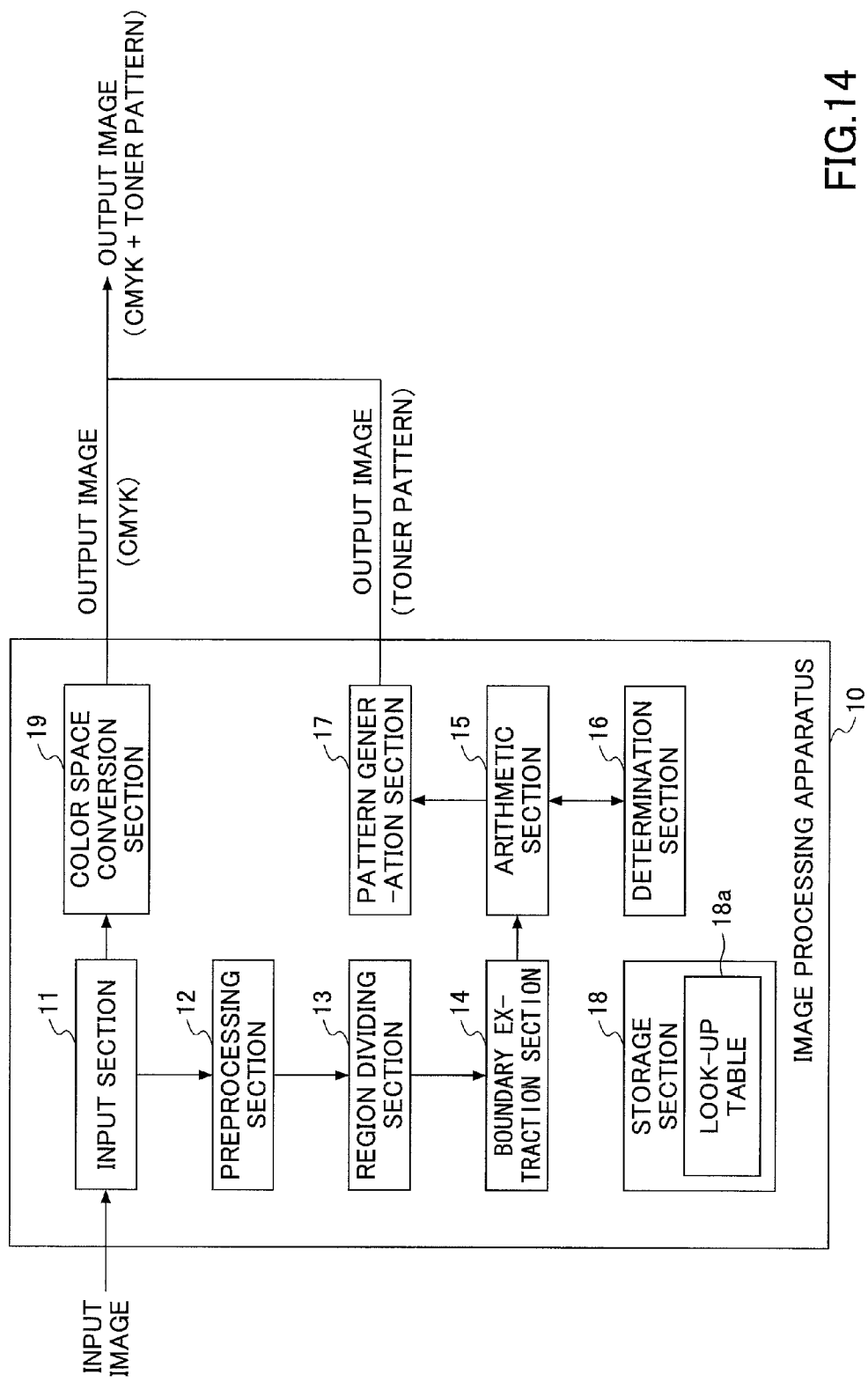
FIG. 14 is a drawing illustrating an example functional block diagram of an image processing apparatus according to a third embodiment.

However, in the image processing apparatus 10 according to the third embodiment, as illustrated in FIG. 14, there is a look-up table 18a having been registered in the storage section 18 in advance.

FIG. 15 illustrates an example of the look-up table 18a. In the look-up table 18a of FIG. 15, "I" and "grad" denote the luminance and the luminance gradient, respectively. Regarding the divided numbers in the look-up table 18a, the luminance "I" and the luminance gradient "grad" in this example are divided into four.

However, the number of the divided luminance "I" and the luminance gradient "grad" may vary depending on, for example, the requesting accuracy.

Namely, the higher the accuracy becomes, the more the dividing number in the look-up table becomes.

Further, the figures in the elements of the luminance "I" and the luminance gradient "grad" is expressed in "%" of the clear toner density.

For example, when the luminance is equal to or greater than 0 and less than 50 and the luminance gradient is equal to or greater than 0 and less than 25, the clear toner density is 10%.

Operations in Image Processing Apparatus

Figure 16:
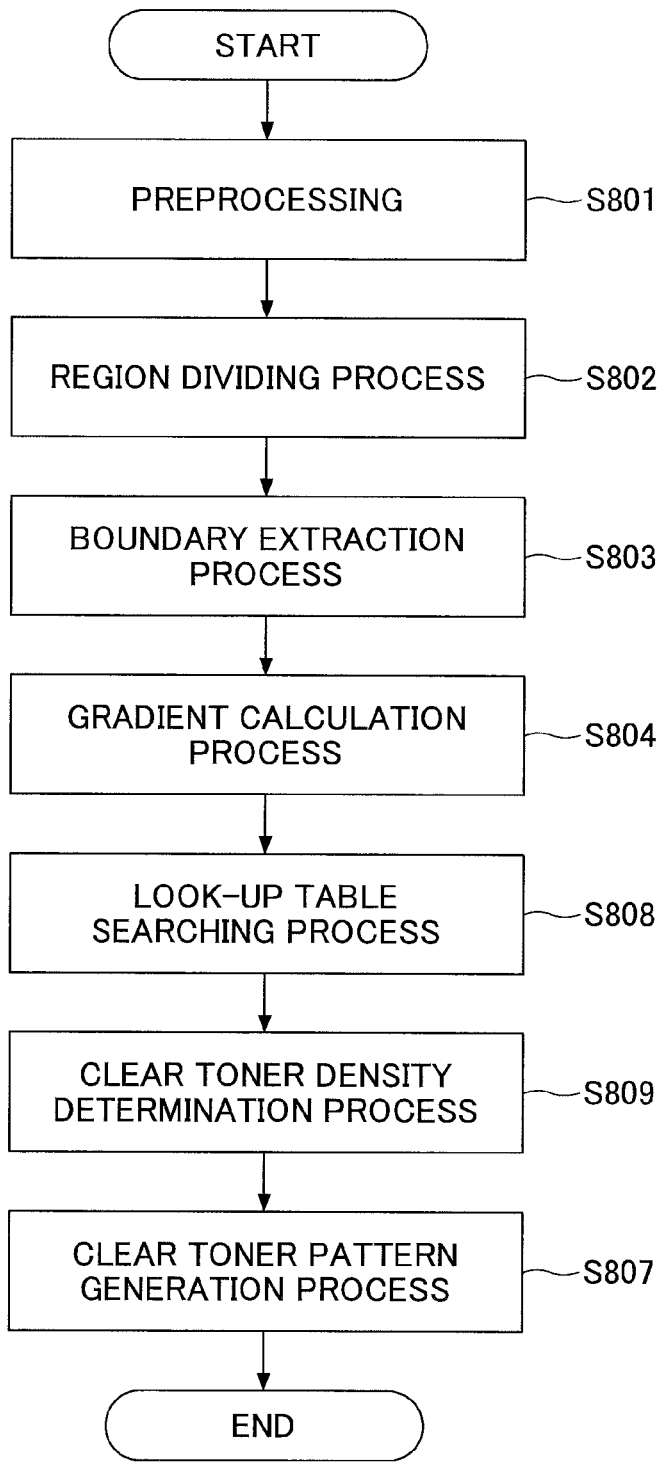
FIG. 16 is an example flowchart of entire operations of an image processing apparatus according to the third embodiment.

Next, the operations of an image processing apparatus according to the third embodiment are described with reference to the flowchart of FIG. 16. The processes differs from those in the first embodiment are in steps S808 and S809.

First, in step S801, the preprocessing section 12 performs the processes including the noise reduction process, the resolution conversion process and the like (preprocessing). Next, in step S802, the region dividing section 13 performs the region dividing process dividing the input image (acquired image) into a target region where the toner pattern is to be formed and another region (region dividing process).

Next, in step S803, the boundary extraction section 14 inputs the regions divided by the region dividing section 13 as the target region, and extracts the boundary part of the target region (boundary extraction process). Details of the boundary extraction process are already described with reference to FIG. 9, and the repeated description thereof is herein omitted.

Next, in step S804, the arithmetic section 15 calculates the feature amount of the image data included in the boundary region of the target region (gradient calculation process). As the feature amount of the image data, the arithmetic section 15 calculates the gradients at the boundary pixels.

In this embodiment, the gradient refers to the luminance "I" and the luminance gradient "grad". For simplification purposes, the luminance gradient "grad" is approximated using the difference from the adjacent pixel.

Next, in step S808, the determination section 16 searches for the look-up table. In step S809, the determination section 16 specifies the clear toner density corresponding to the luminance "I" and the luminance gradient "grad" calculated in step S804.

In step S807, the determination section 16 performs the gradation process of the clear toner pattern based on the specified clear toner density.

As described above, in the image processing method according to this embodiment, the relationships between the luminance and the luminance gradient extracted from the input image and the clear toner density to be applied to the region are stored as the look-up table.

Further, by using the look-up table, the clear toner density to be applied to each of the pixels of the input image is determined. By implementing (using) the look-up table where the luminance and the luminance gradient are associated and stored with the clear toner density, it may become possible to quickly determine the clear toner density corresponding to each of the pixels in generating the toner pattern.

Further, in the above look-up table, the values of the clear toner density are simply managed using figures. However, the present invention is not limited to this configuration. For example, instead of the clear toner density values, the types of the dithering patterns determined in consideration of the performance of the printer (image forming apparatus including the image processing apparatus) may be stored in the look-up table.

Figures 17, 18:
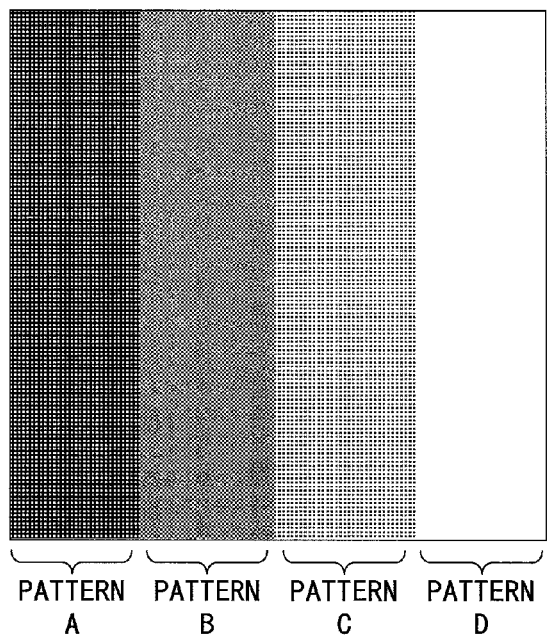
FIG. 17 is a drawing illustrating an example dithering pattern.
FIG. 18 is an example look-up table.

FIG. 17 illustrates an example of the dithering patterns. In FIG. 17, the example of the dithering patterns includes patterns A, B, C, and D, which may be used as the corresponding figures of the clear toner density. Namely, the clear toner may be applied to the parts of the black pixels in the patterns A through C. The pattern D is a white pattern to which no clear toner is applied.

FIG. 18 is an example look-up table where the dithering patterns are used. In the look-up table, not the clear toner densities but the dithering patterns corresponding to the clear toner densities are managed. The letters A through D stored in the table denote the dithering patterns corresponding to the elements (values) of the combinations of the luminance "I" and the luminance gradient "grad".

For example, when the luminance is equal to or greater than 0 and less than 50 and the luminance gradient is equal to or greater than 0 and less than 25, the dithering pattern "B" is selected. The dividing numbers of the look-up table may be arbitrarily determined.

Further, to generate the dithering patterns, a generally known method may be used. Further, the dithering pattern is one example of the pattern of the recording material. Namely, instead of using the dithering pattern, a line screen (stripe-shaped) pattern, halftone dots or the like may be used, and the similar effect may also be obtained.

Further, regarding the look-up table, in the above description, a case is described where the luminance and the luminance gradient are stored in the look-up table. However, the present invention is not limited to this configuration. Namely, in the any appropriate feature amount other than the luminance and the luminance gradient may also be associated and stored with the pattern of the recording material (or the clear toner density) in the look-up table in advance.

The associations between the feature amount and the pattern of the recording material (or the clear toner density) indicates how the pattern of the recording material (or the clear toner density) may effect on the object region (target region) on the printing and further indicates which of the patterns (densities) may fit which of the states of the gradient and the degree of the blur in the boundary of the object region.

Therefore, the pattern examples indicating the above associations along with the corresponding feature amounts may be stored in the look-up table in advance.

As described above, by using the look-up table as described above, it may become possible to quickly generate the clear toner pattern so as to provide a sufficient effect on the printing.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

For example, in the above embodiments, the gradation of the pattern of the recording material in the boundary region is determined in accordance with the degree of change of color in the boundary region. In this case, the degree of change of color in the boundary region may be determined based on the luminance gradient only or based on the luminance gradient and the angle of the gradient.

Alternatively, the degree of change of color in the boundary region may be determined based on the luminance gradient, the angle of the gradient, and the degree of change of one or more colors in the boundary region.

Further, in the above embodiment, it is assumed that the toner pattern is formed by using a non-color toner. However, for example, a color toner may alternatively be used.

The image processing apparatus according to an embodiment of the present invention may be included in an image forming apparatus such as a printer, a multifunctional peripheral, a laser printer and the like. Further, an image processing apparatus according to an embodiment of the present invention may be configured as a semiconductor device such as an LSI (Large Scale Integration) device including the image processing section.

What is claimed is:

1. An image processing apparatus for generating a pattern of a recording material to be overlapped on an original image for forming an image of a target region extracted from the original image, the image processing apparatus comprising:
    an arithmetic unit configured to calculate a feature amount of an image data included in a boundary region of the target region;
    a determination unit configured to determine a degree of change of color in the boundary region based on the feature amount; and
    a pattern generation unit configured to determine a gradation of the pattern of the recording material for the boundary region in accordance with the degree of change of color in the boundary region,
    wherein the determination unit is configured to determine a luminance gradient and a direction of the luminance gradient in the boundary region as the degree of change of color in the boundary region.

2. The image processing apparatus according to claim 1,
    wherein the arithmetic unit is configured to calculate a luminance of the boundary region as the feature amount, and
    wherein the determination unit is configured to determine the degree of change of color in the boundary region based on the luminance.

3. The image processing apparatus according to claim 2,
    wherein the pattern generation unit is configured to determine a gradation of the pattern of the recording material for the boundary region in accordance with the luminance gradient and the direction of the luminance gradient in the boundary region.

4. The image processing apparatus according to claim 1,
wherein the arithmetic unit is configured to calculate one or more colors and a luminance of the boundary region as the feature amount, and
wherein the determination unit is configured to determine the degree of change of color in the boundary region based on the one or more colors and the luminance.

5. The image processing apparatus according to claim 4,
wherein the determination unit is configured to determine one or more colors, the luminance gradient, and the direction of the luminance gradient in the boundary region as the degree of change of color in the boundary region, and
wherein the pattern generation unit is configured to determine a gradation of the pattern of the recording material for the boundary region in accordance with the one or more colors, the luminance gradient, and the direction of the luminance gradient in the boundary region.

6. The image processing apparatus according to claim 2,
wherein the arithmetic unit is configured to select a main resolution using a Hessian determinant based on plural resolutions calculated using a multi-resolution analysis and calculate a luminance of the boundary region or one or more colors and the luminance of the boundary region based on an image in the selected main resolution.

7. The image processing apparatus according to claim 6,
wherein the arithmetic unit is configured to select the main resolution using the frequency distribution of the Hessian determinant with respect to the plural resolutions.

8. The image processing apparatus according to claim 1,
wherein the arithmetic unit is configured to calculate a luminance and a luminance gradient of the boundary region as the feature amount, and
wherein the determination unit is configured to determine a gradation of the pattern of the recording material in the boundary region based on a density of the recording material specified based on the calculated luminance and the luminance gradient using a look-up table where the luminance and the luminance gradient are associated and stored with the density of the recording material.

9. The image processing apparatus according to claim 1,
wherein the arithmetic unit is configured to calculate a luminance and a luminance gradient of the boundary region as the feature amount, and
wherein the determination unit is configured to determine a gradation of the pattern of the recording material in the boundary region based on the pattern of the recording material specified based on the calculated luminance and the luminance gradient using a look-up table where the luminance and the luminance gradient are associated and stored with the pattern of the recording material.

10. An image processing method for generating a pattern of a recording material for forming an image of a target region extracted from the original image, the image processing method comprising:
calculating a feature amount of an image data included in a boundary region of the target region;
determining a degree of change of color in the boundary region based on the feature amount; and
determining a gradation of the pattern of the recording material for the boundary region in accordance with the degree of change of color in the boundary region,
wherein determining the degree of change of color in the boundary region is determined based a luminance gradient and a direction of the luminance gradient.

11. A non-transitory recording medium storing a computer-readable program for generating a pattern of a recording material for forming an image of a target region extracted from the original image, the computer-readable program comprising:
calculating a feature amount of an image data included in a boundary region of the target region;
determining a degree of change of color in the boundary region based on the feature amount; and
determining a gradation of the pattern of the recording material for the boundary region in accordance with the degree of change of color in the boundary region,
wherein determining the degree of change of color in the boundary region is determined based a luminance gradient and a direction of the luminance gradient.

* * * * *